United States Patent
Bacher et al.

(10) Patent No.: US 8,992,067 B2
(45) Date of Patent: Mar. 31, 2015

(54) DEVICE AND METHOD FOR THE PREPARATION OF RECYCLABLE THERMOPLASTIC PLASTIC MATERIAL

(75) Inventors: Helmut Bacher, St. Florian (AT); Helmuth Schulz, Linz (AT); Manfred Hackl, St. Florian (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 1701 days.

(21) Appl. No.: 11/632,382

(22) PCT Filed: Jun. 27, 2005

(86) PCT No.: PCT/AT2005/000235
§ 371 (c)(1),
(2), (4) Date: Dec. 31, 2007

(87) PCT Pub. No.: WO2006/007610
PCT Pub. Date: Jan. 26, 2006

(65) Prior Publication Data
US 2008/0290537 A1    Nov. 27, 2008

(30) Foreign Application Priority Data

Jul. 16, 2004    (AT) ................................ A 1217/2004

(51) Int. Cl.
*B01F 7/20* (2006.01)
*B29B 17/04* (2006.01)
*B01F 7/18* (2006.01)
*B01F 13/10* (2006.01)
(Continued)

(52) U.S. Cl.
CPC ............... *B29B 17/0412* (2013.01); *B01F 7/18* (2013.01); *B01F 13/1013* (2013.01); *B01F 13/1016* (2013.01); *B01F 13/1047* (2013.01); *B01F 15/0251* (2013.01); *B01F 15/0288* (2013.01); *B29B 7/7466* (2013.01); *B29B 13/10* (2013.01);
(Continued)

(58) Field of Classification Search
USPC .................... 366/75; 222/142.4, 145.1, 145.4
See application file for complete search history.

(56) References Cited

U.S. PATENT DOCUMENTS 802,996 A * 10/1905 Von Krottnaurer ........ 366/182.3
3,200,867 A *  8/1965 Siegfried ................... 241/101.6
(Continued)

FOREIGN PATENT DOCUMENTS

EP    1057604 A1    4/2000
FR    1301959 A     8/1962
(Continued)

*Primary Examiner* — David Sorkin
*Assistant Examiner* — Abbas Rashid
(74) *Attorney, Agent, or Firm* — Kilpatrick Townsend & Stockton LLP

(57) ABSTRACT

An apparatus for the preparation of thermoplastic plastics material to be recycled has two treatment stages following one after the other. At least two receiving containers, which are capable of being evacuated and which are attached in parallel to a receiving container of the second stage, are present in the first stage. A device is present by which an alternating batch-wise charging of the receiving container of the second stage takes place from the receiving containers of the first stage. The said device controls discharge members of the receiving containers of the preceding stage, which leads into a channel. A shut-off member is provided for each receiving container of the preceding stage in the said channel. The alternating device controls the shut-off members.
The method of preparing thermoplastic plastics material, to be recycled, utilizes an apparatus of this type.

18 Claims, 4 Drawing Sheets

(51) Int. Cl.
  *B01F 15/02* (2006.01)
  *B29B 7/74* (2006.01)
  *B29B 13/10* (2006.01)
  *B29B 17/00* (2006.01)
  *B29C 47/36* (2006.01)
  *B29C 47/00* (2006.01)
  *B29C 47/10* (2006.01)

(52) U.S. Cl.
  CPC ........... *B29B 17/0036* (2013.01); *B29C 47/369* (2013.01); *B29B 2017/048* (2013.01); *B29B 2017/0488* (2013.01); *B29C 47/0019* (2013.01); *B29C 47/1018* (2013.01); *B29C 47/1081* (2013.01); *B29C 47/366* (2013.01)
  USPC ......................................... 366/75; 222/145.4

(56) References Cited

U.S. PATENT DOCUMENTS

| | | | |
|---|---|---|---|
| 3,995,819 A * | 12/1976 | Kunogi et al. | 241/58 |
| 4,344,579 A | 8/1982 | Honjyo et al. | |
| 4,955,550 A * | 9/1990 | Satake et al. | 241/101.4 |
| 5,536,154 A | 7/1996 | Bacher et al. | |
| 6,619,575 B1 | 9/2003 | Bacher et al. | |
| 6,784,214 B1 | 8/2004 | Bacher et al. | |
| 2004/0060673 A1* | 4/2004 | Phillips et al. | 162/22 |

FOREIGN PATENT DOCUMENTS

WO   WO 89/07042 A1   8/1989
WO   WO 03/103915 A1  12/2003

* cited by examiner

DEVICE AND METHOD FOR THE PREPARATION OF RECYCLABLE THERMOPLASTIC PLASTIC MATERIAL

CROSS-REFERENCES TO RELATED APPLICATIONS

This application is a National Stage of International Application No. PCT/AT2005/000235, filed Jun. 27, 2005, and which claims the benefit of Austrian Patent Application No. A1217/2004 filed Jul. 16, 2004, the disclosures of both of which applications are incorporated herein by reference.

BACKGROUND OF THE INVENTION

The invention relates to an apparatus for the preparation of thermoplastic plastics material to be recycled, with at least two treatment stages—following one after the other with respect to the flow of material—for the material, in which in each stage the material is introduced into a receiving container from above and is heated and mixed, and optionally also crushed, in the receiving container by rotating tools, and the material treated in this way is discharged from the respective receiving container by means of a discharge member, preferably by means of at least one screw. In addition, the invention relates to a method of preparing thermoplastic plastics material to be recycled, using an apparatus defined in the introduction.

An apparatus of the type described in the introduction is known (AT 411235 B). In the case of a known apparatus of this type, a continuous flow of material takes place through the two receiving containers which are arranged in series and are under vacuum. In this way, a recycled plastics-material product of adequate quality can be obtained in most cases. In the field of foodstuffs packaging, in particular drinks bottles, however, particularly high demands are made with respect to the decontamination of the plastics material treated. The quality of the decontamination depends upon the vacuum and temperature conditions prevailing during the treatment and, in particular, upon the dwell period which the individual particles of plastics material spend in the receiving container. Investigations have shown that in the case of the continuous process mentioned above the period which the individual particles of plastics material spend in the receiving container. Investigations have shown that in the case of the continuous process mentioned above the said dwell period can be of widely differing duration, depending upon whether the particles of material being treated or a plurality of such particles spend a relatively long time in the receiving container before they are removed from it by the screw, or whether individual particles of material succeed in leaving the receiving container relatively quickly again after being introduced into the said receiving container.

BRIEF SUMMARY OF THE INVENTION

The object of the invention is to avoid the difficulties described and to improve an apparatus of the type described in the introduction in such a way that the shortest dwell period is made at least substantially equal for all the particles of material, so that material which is substantially improved in terms of decontamination is obtained from the apparatus. The object is attained according to the invention in that at least two receiving containers, which are capable of being evacuated and which are attached in parallel to a receiving container—capable of being evacuated—of the last stage, are present in the first stage or in at least one subsequent stage, a device being provided for the alternating batch-wise charging of the receiving container of the last stage from the receiving containers of the preceding stage, and in that the discharge member of each receiving container of the preceding stage leads into a channel in which a shut-off member is provided for each receiving container of the preceding stage, the shut-off member being controlled by the device for the alternating batch-wise charging of the receiving container of the last stage. Whereas—in the case of the known apparatus described in the introduction—a continuous passage of the material through the two stages of the apparatus therefore takes place, in the case of the apparatus according to the invention the charging of the receiving container of the last stage is carried out in each case from another receiving container of the preceding stage. During this charging from the respective receiving container of the preceding stage, in the other container or in the other containers of the preceding stage the filling is carried out and the material is brought to and kept at the required temperature by the rotating tools and is thus prepared in the manner desired. As soon as the emptying of the material from the receiving container of the preceding stage hitherto connected in terms of flow to the receiving container of the last stage has been concluded, the above-mentioned device is changed over, so that another receiving container of the preceding stage is now connected in terms of flow to the receiving container of the last stage and is emptied into it. During this, the previous emptied receiving container of the preceding stage can be filled once more and the material present in it can be brought to the desired temperature. The procedure is similar if the preceding stage contains more than two containers. The shut-off members in the channel ensure a reliable closure of all those receiving containers of the preceding stage which are just being filled or in which a pre-heating (and optionally crushing) of the material being treated takes place, with respect to the receiving container of the last stage. They therefore also provide for the vacuum conditions and dwell periods which are important for the treatment of contaminated plastics material. Within the scope of the invention the shut-off members are advantageously formed by slides which can be actuated hydraulically or pneumatically.

An apparatus for the treatment of mixtures of unprocessed rubber has been disclosed by EP 1 057 604 A1; this has an internal mixer for plasticizing the basic mixture, with which are associated a plurality of mixers without stamps which are charged in succession by the internal mixer and which, after the mixture of unprocessed rubber has cooled down and cross-linking agents have been mixed in, deliver their charges independently of one another to a unit arranged downstream. An apparatus of this type is not suitable for producing recycled plastics material which is intended to be used in the field of foodstuffs packaging.

It is frequently advantageous for the apparatus according to the invention to be designed in such a way that the channel connects the discharge openings of the receiving containers of the preceding stage or the outlet openings of the discharge members of the said receiving containers to a charging opening of the receiving container of the last stage, and that the device comprises a control device which controls the shut-off members in the manner of an alternating closure of the receiving containers of the preceding stage with respect to the receiving container of the last stage.

The method according to the invention for preparing thermoplastic plastics material to be recycled is based on a method using an apparatus described in the introduction and is characterized according to the invention in that the receiving container of the last stage is charged alternately and, as far as possible, continuously from the receiving containers of the preceding stage. As has already been mentioned, a substantially improved decontamination over a desired minimum dwell period of the material being treated can be achieved by this manner of operation which is simple to carry out with respect to the method.

Further characteristics and advantages of the apparatus according to the invention and of the method according to the invention may be seen in the following description of embodiments, in which the apparatus are illustrated diagrammatically in the drawings.

DETAILED DESCRIPTION OF THE INVENTION

Figure 1:
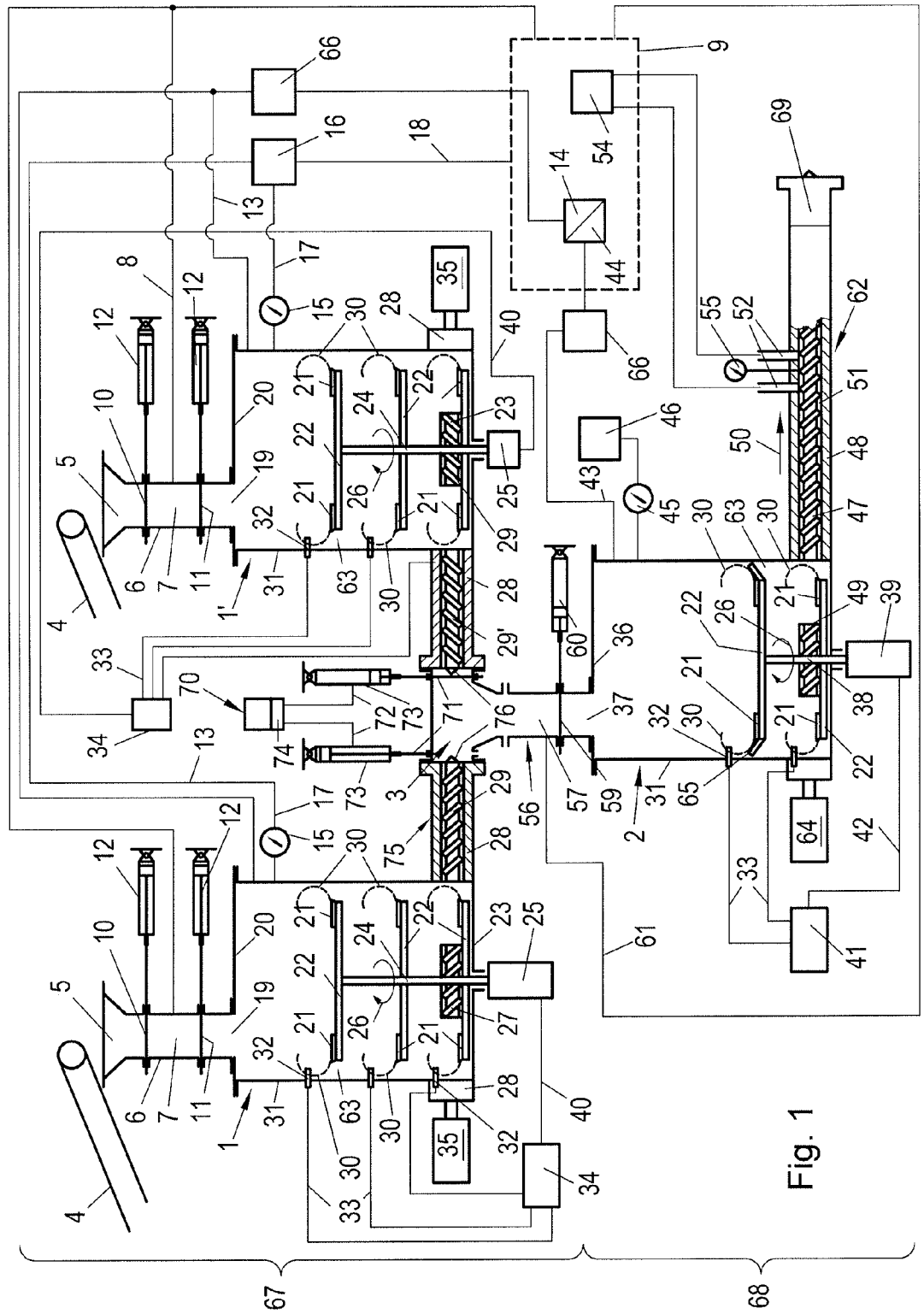
FIGS. 1 to 4 in each case show an embodiment in vertical section.

The device according to FIG. 1 has two stages 67, 68 of treating the thermoplastic plastics material, which is frequently PET (polyethylene terephthalate), in particular in the form of material to be ground from bottles and pre-forms of bottles, foils, fibres etc., possibly in a pre-crushed form. In the embodiment illustrated the first stage 67 has two receiving containers 1, 1', to which the material to be treated is supplied by way of conveyor belts 4 and funnels 5. For the vacuum treatment in the receiving containers 1, 1', a sluice 6, which is constructed in the form of a vacuum sluice, can be provided for the introduction of the material, the interior 7 of the said vacuum sluice being connected by way of a line 8 to an evacuation device 9. Each sluice 6 is provided at the top and bottom with two slides 10, 11 which close in a vacuum-tight manner and which can be displaced by double-acting cylinders 12 which are advantageously actuated hydraulically or pneumaticcally. In this way, even when the introduction of the material—to be recycled—into the respective container 1 or 1' is taking place, an adequate vacuum can be maintained in the said container 1 or F. In addition, for the vacuum treatment of the material, the interior of each container 1, 1' is connected by way of a line 13 to a vacuum pump 14 of the evacuation device 9. A vacuum-measuring appliance 15 constantly measures the vacuum and feeds the measurement values by way of a line 17 to a monitoring device 16 which controls the evacuation device 9 by way of a line 18 in such a way that the desired vacuum is always maintained in the containers.

Each sluice 6 is connected to a feed opening 19 in the lid 20 of the respective container 1, 1', so that the plastics material to be treated in the container 1 and 1' drops from above onto tools 21 which are mounted on a plurality of tool carriers 22 which are arranged one above the other on a vertical shaft 24 passing through the base 23 of the container in a vacuum-tight manner and which are driven by a motor 25 so as to rotate about the axis of the shaft 24 in the direction of the arrow 26. The lowest of the said tool carriers 22 is situated just above the base 23 of the container 1 and 1' respectively in such a way that the tools 21 carried by it are situated at the height of a discharge opening 27 which is connected in terms of flow to the draw-in opening of a housing 28 of a screw 29 and 29' respectively, which housing 28 is attached tangentially to the container 1. As a result, the rotating tools 21 of the lowest tool carrier 22 press the treated material into the threads of the screw 29, on the one hand by the effect of centrifugal force and on the other hand in the manner of a spatula, when the tools 21 are arranged on the tool carrier 22 in a suitable manner. The screw 29 and 29' respectively can optionally be replaced by a cellular-wheel sluice or the like as a discharge member.

The tools 21 cause the plastics material engaged by them to circulate about the axis of the container 1 and 1' respectively, the material being heated by the mixing energy introduced and rising in the form of a mixing spout 30. A temperature sensor 32 is arranged on the lateral wall 31 of the respective container 1, 1' in the region of the mixing spout at a distance above the tool carrier 22, the said temperature sensors being connected by way of lines 33 to a regulating device 34 which controls the rotational speed of the motor 25 by way of a line 40 in such a way that overheating of the material being treated in the container 1 and 1' respectively is prevented.

The screw 29 and 29' respectively driven by a motor 35 conveys the material being treated in the container 1 and 1' respectively into a channel 3 which connects the discharge openings 27 of the two containers 1, 1' or the outlet openings of the two screw housings 28 respectively to the charging opening 37 in the lid 36 of a receiving container 2 of the second stage 68. In addition, the container 2 is capable of being evacuated and, to this end, is connected by way of a line 43 to a vacuum pump 44 of the evacuation device 9. All the containers 1, 1', 2 can be evacuated by means of the same vacuum pump, but in order to make the unit more versatile it is more advantageous to provide separate vacuum pumps 14, 44 for the containers, since, in this way, different underpressure conditions in the containers 1, 1' and 2 respectively can be achieved in a simple manner and can be maintained. The pressure in the container 2 is measured by means of a vacuum-measuring appliance 45 and is reported by way of a monitoring device 46 to the evacuation device 9, so that the desired vacuum conditions can always be maintained in the container 2.

The prepared plastics material is discharged out of the container 2 by means of a screw 47, the draw-in opening of the screw housing 48 being attached to a discharge opening 49 of the container 20 in a similar manner to what has been described for the containers 1, P. The said discharge opening 49 is situated at the level of the tools 21 of the container 2 which are carried by the lowest tool carrier 22, so that the filling of the screw 47 is carried out in a manner similar to what has been described for the screws 29, 29'. The core diameter of the screw 47 increases in the conveying direction (arrow 50), so that the material conveyed by the screw 47 is compressed first. As a result, the screw 27 together with its housing 48 acts as a vacuum-tight closure of the container 2. Following the said compression zone, the core diameter of the screw 47 is reduced again, so that a relaxation zone 51 is formed in which at least one de-gassing opening 52 passes through the screw housing 48. Lines 53 for the removal of the gases are provided at the said openings 52, and this can be assisted by a vacuum pump 54 of the evacuation device 9. The vacuum produced in this way can be monitored by means of a vacuum-measuring appliance 55. A filtering device and/or an extruder head with a granulating device 69, or a moulding unit, can be attached to the outlet of the screw housing 48.

While the second stage 68 is operating continuously in order to ensure a continuous supply of the granulating device 69 or a mould optionally replacing it, the containers of the first stage 67 operate in a batch-wise (portion-wise) manner in such a way that at all times only one of the containers 1, 1' of the first stage 67 is connected in terms of the flow of material to the container 2 of the second stage 68, whereas the other container 1 or 1' respectively of the first stage 67, on the other hand, is closed off with respect to the container 2. To this end a device 70 is provided which controls the two shut-off members 71—advantageously formed by slides—by means of a control device 74 in such a way that one shut-off member 71 is open when the other shut-off member 71 is closed. The open position is illustrated for the left-hand shut-off member 71, and the closed position for the right-hand shut-off member 71. The control device 74 is connected by way of lines 72 to double-acting cylinders 73, by way of which the slides 71 are displaced. The two slides 71 are advantageously situated close to the outlet of the screw housing 28 in question.

During operation, the procedure is such that the receiving container 2 of the second stage 68 is charged by turns, i.e. in an alternating manner, from one of the receiving containers 1, 1' of the first stage 67 in each case. During the charging of the container 2 from one of the containers of the first stage 67, the respective other containers of the said stage 67 are filled, and the material present in them is brought to the desired temperature and is kept at this temperature by the rotating tools 21. Since the respective container 1 or 1' is closed off with respect to the container 2 by the shut-off member 71 associated with it and the respective screw 29 is of course stopped during this procedure, the material present in the respective container 1 or 1' cannot escape out of the said container and it must therefore spend the desired dwell period in it. This means that each particle of material in question is subjected to the temperature conditions and pressure conditions prevailing in the respective container 1 or 1' respectively for an adequate dwell period. In this way, a substantially improved decontamination of each particle of material is achieved.

As soon as it has been established, by appropriate monitoring of the temperature conditions and pressure conditions, that the particles of material present in the respective container 1 or 1' respectively have reached the desired state, a change-over is carried out by means of the device 70, so that the particles of material pre-treated in the respective container 1 or 1' beforehand can now be removed from the respective container 1 or 1' by means of the screw 29 or 29' respectively and can arrive in the container 2 of the second stage 68 by way of the connecting channel 3. This is achieved by opening the respective shut-off member 71 and by bringing the respective screw 29 or 29' into operation. At the same time, the other screw 29 or 29' respectively is stopped and the shut-off member 71 adjacent to it is closed, so that each container 1 or 1' respectively, from which the filling of the container 2 was carried out beforehand, is now closed off with respect to the container 2. The said container 1 or 1' respectively of the first stage 67 can now be filled once again and, after that, the material present in it can be brought to the desired temperature and can be kept there by means of the tools 21, the shut-off state of the respective container 1 or 1' being maintained with respect to the container 2 until the particles of material present in the respective container 1 or 1' have gone through the desired dwell period, as already described. After that, a change-over can be carried out once more by means of the device 70 and so on.

An additional slide 59, which is actuated by means of a double-acting cylinder 60, can be arranged in the vicinity of the charging opening 37 of the container 2. As a result, the channel 3 can also be closed off in a vacuum-tight manner with respect to the container 2, so that a transfer sluice 56 is formed as it were, the sluice chamber 57 of which can be connected by way of a line 61 to the evacuation device 9. As a result, different vacuum conditions with respect to the containers 1, 1' can also be maintained in the container 2.

The screw 47 can form the component part of an extruder 62 which can be a double-screw extruder. As already indicated, however, the screw 47 can also be purely a conveying screw which supplies the material conveyed by it to a further processing device, for example after plasticization to a moulding unit.

Dust collectors 66, which remove the dust—which occurs as a result of abrasion during the treatment of the particles of plastics material in the containers 1, 1' or 2 respectively—from the air drawn away, can be connected in the lines 17, 43.

It is advantageous for the tool carriers 22 to be constructed in the form of discs with a circular cross-section, so that an annular gap 63 is formed between the edge of each disc and the lateral wall 31 of the respective container 1, 1', 2. The material can pass the respective tool carrier 22 from the top to the bottom only through the said annular gap 63, and this makes a substantial contribution to the achievement of uniform conditions for all the particles present in the respective container 1 or 1' or 2. The multiple arrangement of the tool carriers 22 also makes a contribution to this end, since each tool carrier with its tools 21 again produces swirling—in the form of the mixing spout 30—of the plastics material supplied to it from above. The number of the tool carriers 22 arranged one above the other in the respective container 1, 1' or 2 depends upon the field of application envisaged in each case. For the containers 1, 1' of the first stage 67 a single tool carrier 22 may be sufficient in each case, and possibly also for the container 2 of the second stage 68, but a plurality of tool carriers 22 arranged one above the other are more advantageous for the latter, in order to ensure as far as possible a uniform dwell period of all the particles of plastics material in this container too.

In the case of tool carriers 22 which are constructed in the form of discs, it is advantageous for the edge 65 of the disc to be bent or angled upwards in the manner of a dish, this being illustrated for the container 2 of the second stage 68. This promotes the formation of the mixing spout upwards and counteracts a premature sinking of the particles of plastics material downwards through the gap 63 present between the edge of the disc and the container wall.

If the unit is designed for the treatment of already pre-crushed plastics material, for example material ground from bottles of PET, then the tools 21 need not act in a crushing manner, but they can then be purely mixing and heating tools. If a crushing of the plastics material to be treated is necessary, however, then it is advantageous for the tools 21 to be formed with cutting edges, i.e. in the manner of blades, the said cutting edges advantageously being arranged in such a way that a drawing cut occurs during the rotation of the tools (arrows 26).

It is not necessary for one temperature sensor 32 to be provided for each vertical region of the respective container 1, 1', 2. It is advantageous, however, for the temperature sensors 32 to be arranged at a height at which the respective mixing spout 30 leaves the wall 31 of the respective container.

The screw housings 28 and 48 respectively need not be connected tangentially to the respective containers 1, 1' and 2, but a radial arrangement or an arrangement in the manner of a secant with respect to the respective container is also possible. The tangential arrangement has the advantage, however, that the motor 35 or 64 respectively driving the screw 29 or 29' or 47 respectively can be arranged at one end face of the respective screw housing 28 or 28', and the discharge opening 76 of the screw housing 28 or 28' respectively can be arranged at the other end face thereof. This makes it unnecessary to deflect laterally the material conveyed by the screw 29, 29'.

As may be seen, the design according to the invention is not restricted to the arrangement of only two receiving containers 1, 1' in the first stage 67. It is in fact perfectly possible to select the number of the receiving containers of the first stage 67 to be as many as desired, but usually two or three receiving containers of the first stage 67 is sufficient.

Where appropriate, it is also possible for the charging carried out from the receiving containers 1, 1' of the first stage 67 and alternating batch-wise to be supplied to more than one receiving container 2 of the second stage 68, i.e. for the said charging to be apportioned to a plurality of receiving containers 2.

It is likewise possible for the apparatus to be designed with three stages. With a design of this type, the first stage forms a pre-treatment stage from which the containers of the second stage can be charged in a continuous or batch-wise manner. The second stage of a three-stage design of this type is then designed in the manner as described above for the first stage, and, similarly, the last stage in the case of a three-stage design is designed in the manner as described above for the second treatment stage.

Figure 2:
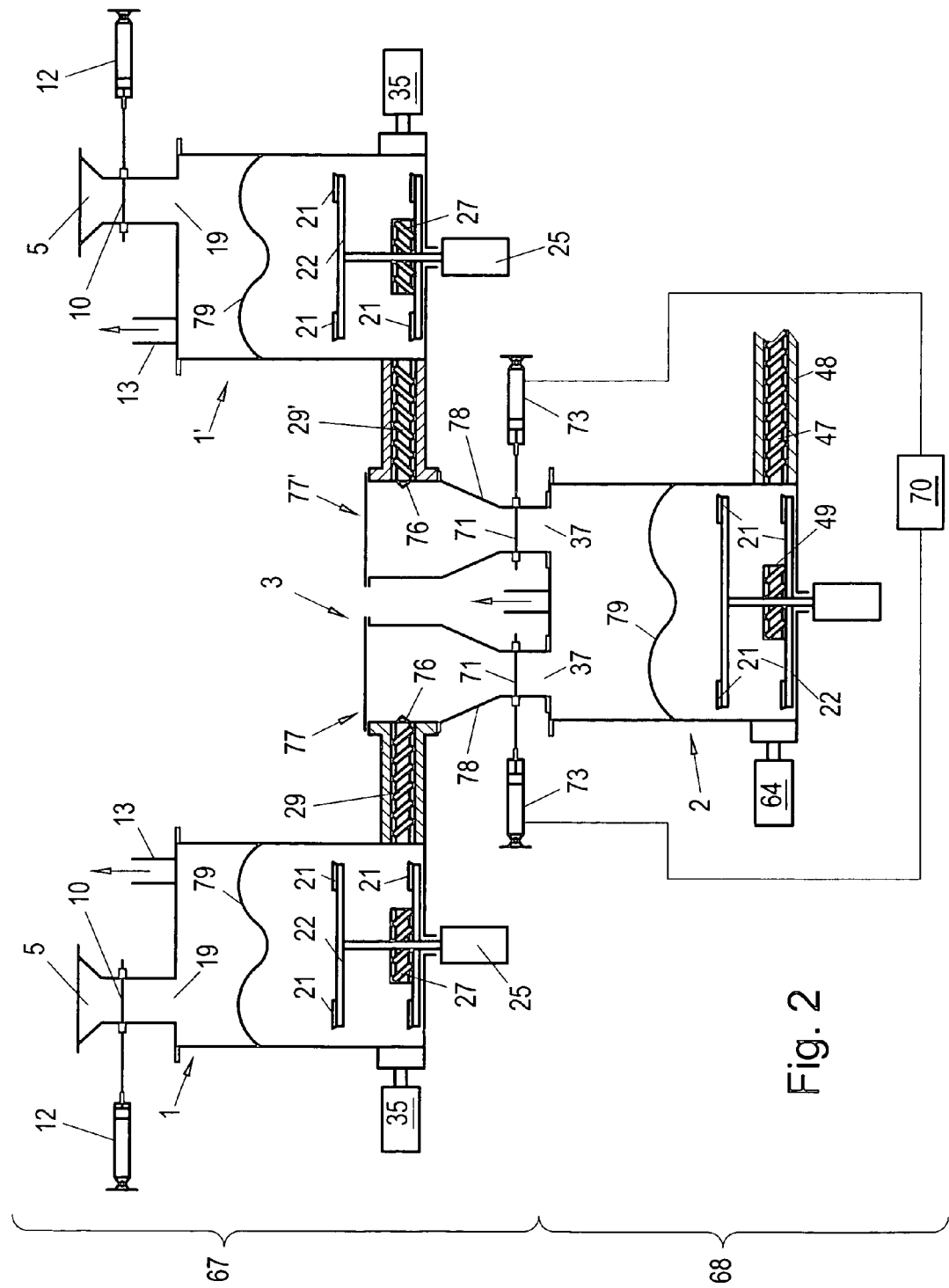

In the embodiment as shown in FIG. 2 the channel 3 for the two receiving containers 1, 1' of the first (preceding) stage 67 is divided into two separate lines 77, 77'. Each of the said lines 77, 77' has a portion 78 which is constructed in the manner of a funnel and which is connected in terms of flow for the treated material to the outlet opening 76 of the respectively associated discharge member 75 formed by the screw 29 and 29' respectively. The shut-off member 71 associated with the respective receiving container 1, 1' is situated at the outlet end—situated below—of the respective funnel 78, and each funnel 78 is connected in teems of flow to a separate charging opening 37 of the receiving container 2 of the last stage associated with the said funnel 78. The mixing spouts produced in the containers 1, 1', 2 during the circulation of the tools 21 are designated 79. The two containers 1, 1' of the preceding stage 67 are charged batch-wise in this case. For a charging of this type it is sufficient for a single closure slide 10 to be arranged in the region of the feed opening 19 which is displaced by a double-acting cylinder 12. Otherwise the design of the apparatus in accordance with FIG. 2 and its manner of operation correspond substantially to that of the embodiment in accordance with FIG. 1.

Figure 3:
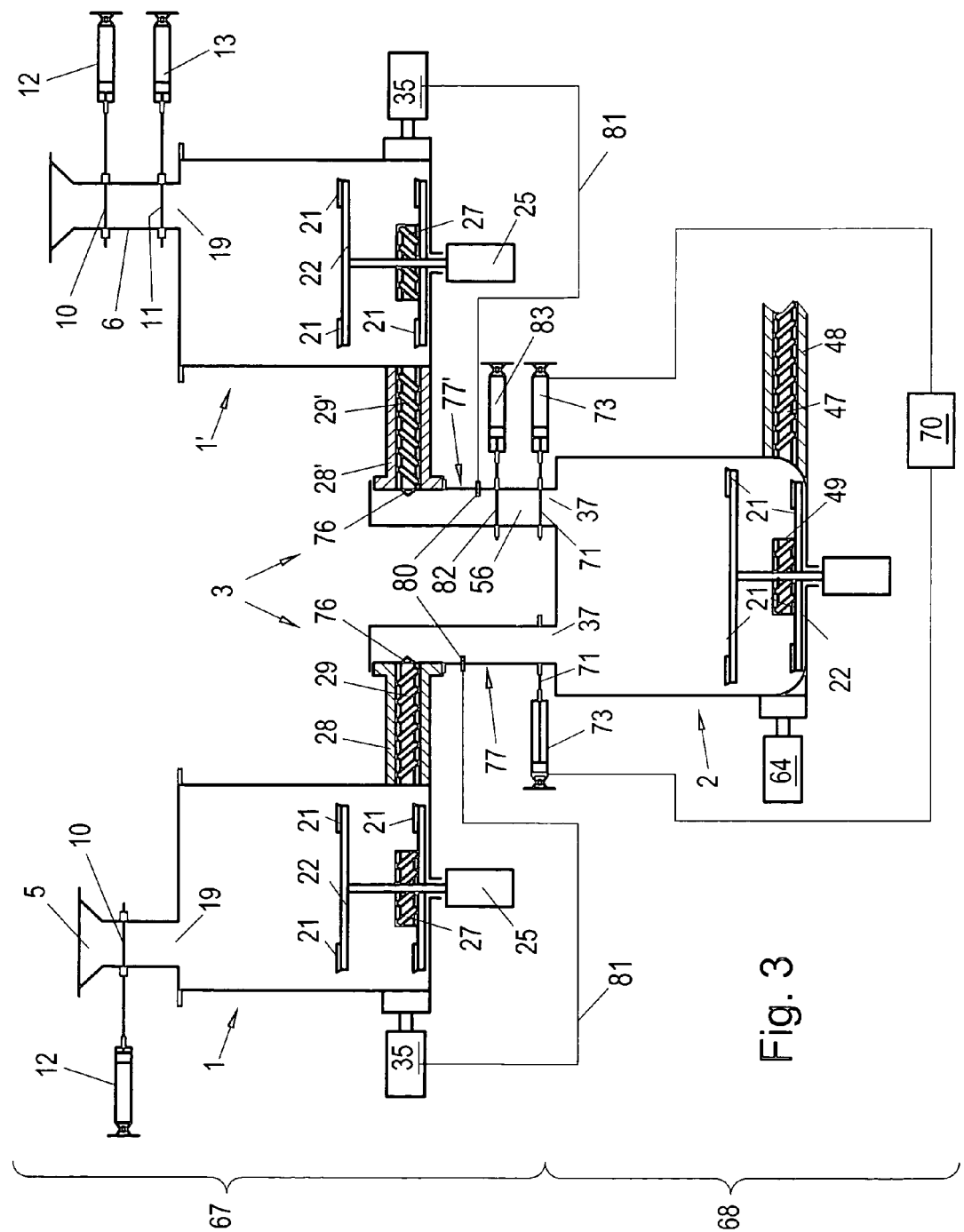

In the case of the embodiment in accordance with FIG. 3, as in the case of the embodiment in accordance with FIG. 2, two separate lines 77, 77' of the channel 3 are provided for the two containers 1, 1' of the preceding stage 67, which are alternately opened or closed by shut-off members 71. A sensor 80 for sensing the quantity of the material, which is supplied by the respective screw 29, 29' and which accumulates above the shut-off member 71 when the latter is closed, is situated in each of the said lines 77, 77'. The said sensor 80 is connected by way of a line 81 to the motor 35 for the screw 29, 29' associated in each case, so that the said motor 35 is controlled in such a way that if a pre-determined filling level in the line 77, 77' is exceeded, which level is sensed by the sensor 80, the respective screw 29 or 29' is stopped.

For the portion 77' of the channel 3 situated on the right it is shown that a further shut-off member 82 is provided above the shut-off member 71, the said shut-off member 82 preferably being formed by a slide which is displaced by a double-acting cylinder 83. The said shut-off member 82, together with the shut-off member 71, forms a sluice which can be evacuated and optionally flushed with protective gas, in a manner similar to what is illustrated for the sluice 57 in FIG. 1. The associated sensor 80 is, of course, situated above the said additional shut-off member 82.

In addition, a sluice 6 similar to that in FIG. 1 is shown for the receiving container 1' shown on the right, whereas only a single slide 10 similar to FIG. 2 is shown for the receiving container 1 shown on the left.

These variants (the slide 10 or the sluice 56 or the sluice 6 respectively) can, of course, be combined with one another in any manner desired.

Figure 4:
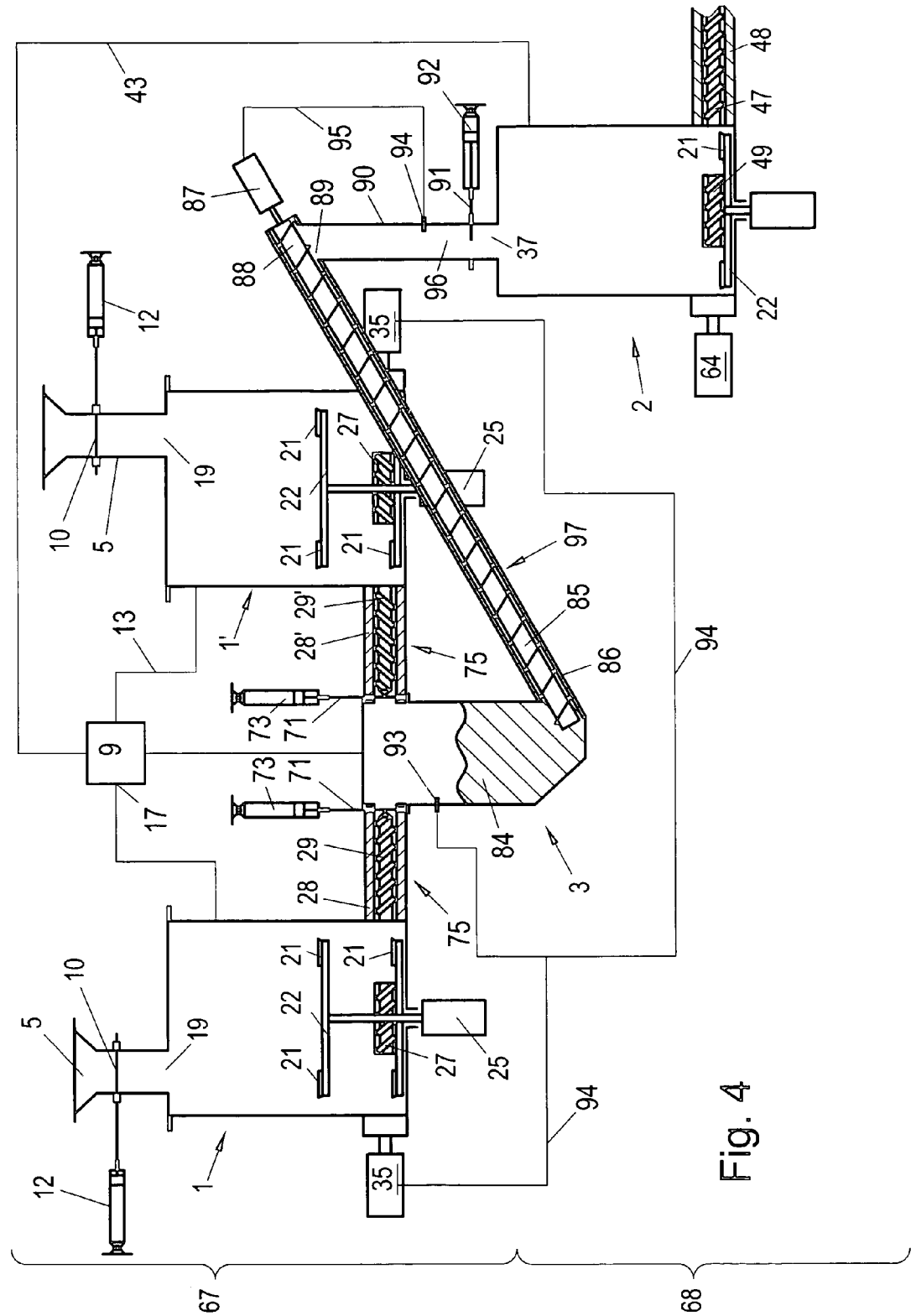

In the case of the embodiment in accordance with FIG. 4, the channel 3 also contains a collecting chamber 84 which is charged with material from the two discharge members 75 (screws 29, 29') of the receiving containers 1, 1' of the first stage 67 in an alternating manner (controlled by the shut-off members 71 of the device 70). The said portion of the channel 3 forming the collecting chamber 84 is constructed in the manner of a funnel, and a conveying device 97, in particular a conveying screw 85, which is mounted in a housing 86 and is driven so as to rotate by a motor 87, projects into the lower end of the said portion of the channel 3. The conveying end 88 of the screw 85 is situated above an opening 89 of the screw housing 86, so that the material conveyed by the screw 85 drops into a socket 90 of the channel 3 in which is arranged a slide 91 which can be displaced by a cylinder 92 and which in this way controls the introduction of material into the filling opening 37 of the receiving container 2 of the last stage 68. The said slide 91 is necessary only when such a control is desired.

In order to control the level of the material in the collecting chamber 84, a sensor 93 is provided which controls—by way of lines 94—the motor 35 of the screw 29 or 29' respectively of the two discharge members 75 which is in operation in each case, in such a way that the filling level in the collecting chamber 84 is always kept above a pre-determined minimum level and below a pre-determined maximum level.

In a similar manner, a sensor 94, which is connected by way of a line 95 to the motor 87 of the screw 85, is provided for the socket 90, the sensor 94 controlling the said motor in such a way that the filling level in the socket 90 forming a collecting chamber 96 is kept within specific limits.

The arrangement of a screw 85 of this type has the advantage that the position of the receiving container 2 of the second stage 68 can be selected independently of the position of the receiving containers 1, 1' of the preceding stage 67, so that differences in the filling level or spatial distances can be bridged. In order to be able to adapt to different conditions in this respect, the arrangement is advantageously made that the housing 86 of the screw 85 can be attached to the collecting chamber 84 in different directions.

The collecting chamber 84 and also the housing 86 of the screw 85 are made vacuum-tight and can be evacuated by the evacuation device 9. Where appropriate, a flushing with protective gas can also be provided for all those components which are capable of being evacuated, for which purpose the said components (the containers 1, 1', 2, the collecting chamber 84, the housing 86, the socket 90) can be attached to a source of protective gas by way of suitable lines in a manner not shown. As a result of these steps, air is prevented from reaching the sensitive treated plastics material, so that damage to the said material is avoided.

As may be seen, in all the embodiments the channel 3, whatever shape or design it has, forms a vacuum-tight transition between the two treatment stages 67, 68 in order to prevent the above-mentioned damage to the material by air.

As mentioned, the receiving containers 1, 1' and 2 respectively can be operated at different pressures, and such different pressures can also be present in the collecting chamber 84 and in the screw housing 86 respectively. In order to prevent a return flow of material from the last stage 68 into the preceding stage 67 from occurring as a result of the pressure differences caused in this way, an equalizing device can be present, which prevents a return flow of this type. In the case of the embodiment in accordance with FIG. 4, an equalizing device of this type can be formed in a simple manner by the slide 91 actuated by the cylinder 92, or an additional slide can be inserted into the socket 90, which additional slide closes the socket 90 for the time required in the event of a higher pressure (as compared with the parts of the unit arranged upstream) prevailing in the receiving container 2.

In principle the embodiments in accordance with FIGS. 2 to 4 can be operated in the same way as has already been described for the embodiment in accordance with FIG. 2. In addition, for all the embodiments it is the case that the receiving containers 1, 1' of the preceding stage 67 and/or the last stage 68 are charged in a manner metered with respect to weight. Such a metering with respect to weight can be carried out for the receiving containers 1, 1' by means of weighing devices provided for filling the sluices 6, and in a similar manner a metering with respect to weight can take place for the receiving container 2 by means of a weighing device which senses the weight of the quantity of material above the slide 59 and 91 respectively.

It is advantageous for the material in the receiving containers of the preceding stage 67 to be heated rapidly by the introduction of suitably high mixing energy and then, after the desired temperature has been reached, to be kept at this pre-determined temperature or within a pre-determined temperature range by the introduction of reduced mixing energy. The temperature sensors 32 can be made usable for this purpose. Since the receiving containers 1, 1' and possibly also the receiving container 2 in each case represent a crystallization dryer in which the material is heated and, as a result, dried and crystallized at least in part by the mixing energy introduced by way of the rotating mixing tools 21, it is advantageous in terms of the method to keep the material in the receiving containers 1, 1' of the preceding stage 67 at the pre-determined temperature already mentioned or within a pre-determined temperature range for a pre-determined dwell period, and this can be controlled by the temperature sensors 32 in a simple manner.

The invention claimed is:

1. An apparatus for the preparation of thermoplastic plastics material to be recycled, comprising:
   a first, upstream treatment stage for the material and a second, downstream treatment stage for the material, wherein the stages are disposed in series along a direction of flow of material;
   wherein the first stage comprises at least two first stage receiving containers configured to operate in parallel;
   wherein the second stage comprises at least one second stage receiving container, connected in series to the first stage;
   wherein each receiving container is configured for the material to be introduced thereto from above, wherein each receiving container comprises:
   rotating tools disposed in the container and configured to heat and mix the material; and
   a discharge member configured to discharge the material from the container;
   a device for alternating batch-wise feeding of the second stage receiving container from the first stage receiving containers; and
   a channel into which the discharge member of each receiving container of the first stage leads, wherein the channel comprises a shut-off member provided therein for each receiving container of the first stage, wherein the shut-off member is configured to move between:
   an open position, at which the respective receiving container of the first stage is in fluid communication with the second stage receiving container, and
   a closed position, at which the respective receiving container of the first stage is sufficiently fluidly isolated from the second stage receiving container such that the material is not introduced to the second stage receiving container from the respective receiving container of the first stage,
   the shut-off member being controlled by the alternating device.

2. An apparatus according to claim 1, wherein the second stage receiving container comprises a feed opening, wherein the channel connects the discharge members of the first stage receiving containers to the feed opening, and wherein the alternating device comprises a control device configured to control the shut-off members in an alternating manner.

3. An apparatus according to claim 1, wherein the shut-off members comprise slides.

4. An apparatus according to claim 1, further comprising a vacuum sluice attached to a filling opening of each of the first stage receiving containers.

5. An apparatus according to claim 1, further comprising an equalizing device configured to prevent a backflow of material from the second stage into the first stage at different pressures in the two stages.

6. An apparatus according to claim 1, wherein the second stage receiving container comprises feed openings, and wherein the discharge members of the first stage receiving containers lead to the feed openings by way of separate lines of the channel.

7. An apparatus according to claim 1, wherein at least a portion of the channel comprises a funnel.

8. An apparatus according to claim 1, further comprising at least one sensor configured to sense a level in, wherein the sensors control delivery of material to the channel.

9. An apparatus according to claim 1, wherein at least one component of the apparatus is capable of being evacuated and is capable of being flooded with protective gas.

10. An apparatus according to claim 1, wherein the second stage receiving container comprises a feed opening, the apparatus further comprising a vacuum sluice attached to the feed opening.

11. An apparatus according to claim 1, wherein each of the first stage receiving containers further comprises a temperature sensor configured to determine a temperature of the material within the respective container; and wherein the device for alternating batch-wise feeding alternates the batch-wise feeding based at least partly on input from the temperature sensors.

12. An apparatus according to claim 1, wherein the channel forms a vacuum-tight transition between the first stage and the second stage.

13. An apparatus according to claim 12, wherein the vacuum-tight transition is capable of being evacuated.

14. An apparatus according to claim 1, wherein the second stage receiving container comprises a feed opening, wherein the channel comprises at least one collecting chamber which is fluidly connected to the feed opening.

15. An apparatus according to claim 14, further comprising a conveyor device sealed off against ingress of air, providing the fluid connection between the collecting chamber and the feed opening.

16. An apparatus according to claim 15, further comprising an evacuation device, wherein the conveyor device and the collecting chamber are vacuum-tight and are connected to the evacuation device.

17. An apparatus according to claim 15, wherein a conveying end of the conveyor device is connected to the collecting chamber.

18. An apparatus according to claim 15, wherein the conveyor device comprises a conveyor screw.

* * * * *